United States Patent
Smith et al.

(10) Patent No.: US 11,475,392 B2
(45) Date of Patent: Oct. 18, 2022

(54) SYSTEM FOR PERSONAL MAIL PIECE TRACKING AND TRACING FROM MULTIPLE SOURCES BY USER IDENTIFIER

(71) Applicant: Escher Group, Ltd., Boston, MA (US)

(72) Inventors: Joshua R. Smith, Cambridge, MA (US); Paul Michael Yarin, Cambridge, MA (US); Michael J. Murphy, Salem, NH (US); Andrew Victor Sutherland, II, Cambridge, MA (US); Eric Metois, Arlington, MA (US)

(73) Assignee: Escher Group, Ltd., Boston, MA (US)

( * ) Notice: Subject to any disclaimer, the term of this patent is extended or adjusted under 35 U.S.C. 154(b) by 452 days.

(21) Appl. No.: 16/364,984

(22) Filed: Mar. 26, 2019

(65) Prior Publication Data

US 2019/0220814 A1    Jul. 18, 2019

Related U.S. Application Data

(63) Continuation of application No. 14/314,849, filed on Jun. 25, 2014, now Pat. No. 10,304,026, which is a continuation of application No. 13/948,719, filed on Jul. 23, 2013, now Pat. No. 8,874,451, which is a continuation of application No. 09/966,033, filed on Sep. 28, 2001, now Pat. No. 8,527,284.
(Continued)

(51) Int. Cl.
*G06Q 10/08* (2012.01)
*H04L 51/234* (2022.01)

(52) U.S. Cl.
CPC ......... *G06Q 10/0833* (2013.01); *G06Q 10/08* (2013.01); *H04L 51/234* (2022.05)

(58) Field of Classification Search
None
See application file for complete search history.

(56) References Cited

U.S. PATENT DOCUMENTS 4,839,813 A * 6/1989 Hills ............... G06Q 10/08
                                                          705/30
5,329,589 A    7/1994 Fraser
(Continued)

FOREIGN PATENT DOCUMENTS

WO    WO 02/27618    4/2002

OTHER PUBLICATIONS

PRNewire article: "TanDataJ Corporation Announces Progistics CSJ, The newest, Internet-Enabled Shipping and Rating Software", Jul. 21, 1997.
(Continued)

*Primary Examiner* — Dennis W Ruhl
(74) *Attorney, Agent, or Firm* — Cesari and McKenna, LLP

(57) ABSTRACT

A system and method for linking data objects and physical objects of various kinds to an identified user is described. The system provides to the identified user information relating to the delivery status of mail pieces directed to or sent by the user, and the user then tracks and traces the mail pieces. The system further provides to the identified user information relating to continued sessions through which the user provides to a postal service system information relating to mailing labels and postage.

19 Claims, 13 Drawing Sheets

Related U.S. Application Data

(60) Provisional application No. 60/236,976, filed on Sep. 29, 2000.

(56) References Cited

U.S. PATENT DOCUMENTS

| | | | |
|---|---|---|---|
| 5,656,799 A * | 8/1997 | Ramsden | G01G 19/005 177/2 |
| 5,712,789 A * | 1/1998 | Radican | G06Q 10/08 700/226 |
| 5,780,825 A | 7/1998 | Sato | |
| 5,860,068 A | 1/1999 | Cook | |
| 5,903,878 A | 5/1999 | Talati et al. | |
| 6,156,988 A | 12/2000 | Baker | |
| 6,220,509 B1 * | 4/2001 | Byford | G06Q 10/08 235/375 |
| 6,285,777 B2 | 9/2001 | Kanevsky et al. | |
| 6,285,916 B1 | 9/2001 | Kadaba et al. | |
| 6,292,480 B1 | 9/2001 | May | |
| 6,292,709 B1 | 9/2001 | Uhl et al. | |
| 6,373,817 B1 | 4/2002 | Kung et al. | |
| 6,446,118 B1 | 9/2002 | Gottlieb | |
| 6,463,420 B1 | 10/2002 | Guidice et al. | |
| 6,549,892 B1 | 4/2003 | Sansone | |
| 6,772,130 B1 | 8/2004 | Karbowski et al. | |
| 6,971,105 B1 | 11/2005 | Weber | |
| 6,976,007 B1 * | 12/2005 | Boucher | G06Q 10/08 705/28 |
| 7,265,853 B1 | 9/2007 | Kara et al. | |
| 7,389,238 B2 | 6/2008 | Sansone et al. | |
| 8,527,284 B2 | 9/2013 | Smith et al. | |
| 2002/0052794 A1 | 5/2002 | Bhadra | |
| 2005/0197892 A1 | 9/2005 | Bilibin et al. | |
| 2005/0198165 A1 | 9/2005 | Reddel et al. | |
| 2007/0073551 A1 | 3/2007 | Williams et al. | |
| 2009/0030768 A1 | 1/2009 | Ginter et al. | |

OTHER PUBLICATIONS

EG, pp. A-H; attached.

* cited by examiner

| Status | Type | Delivery | Recipient | Memo |
|---|---|---|---|---|
| ✓ | ✉ | 27.04.01 | Cellular One | May payment |
| ✓ | ✉ | 27.04.01 | City Electric | Paid electric bill for May |
| ✓ | ✉ | 27.04.01 | City Telecom | May payment |
| ✓ | 📦 | 28.04.01 | Land's End | Returned blue jeans |
| ✓ | ✉ | 28.04.01 | Mom | Birthday card and gift certificate |
| 🚚 | ✉ | 28.04.01 | Parking Clerk | Paid parking ticket |
| 🚚 | 📦 | 29.04.01 | Baby GAP | Returned Katy's jumper |
| 🚚 | ✉ | 29.04.01 | HSH Mortgage | Mortgage payment for May |
| 🚚 | 📦 | 29.04.01 | Housing Authority | Request Residential tax exemption |
| 🚚 | 📦 | 30.04.01 | Jim Brett | Vacation photos |
| 🚚 | ✉ | 30.04.01 | American Express | May payment |
| 🚚 | ✉ | 30.04.01 | Megan Smith | Thank you note for dinner |
| 🚚 | ✉ | 30.04.01 | MBNA VISA | May payment |

POSTPORT™

HOME | MY MAIL | VIRTUAL POST OFFICE | NETWORK BANKING | DIRECTORY SERVICES | MY PROFILE

User ID: fred123@llserv1.com
Physical Address:
101 Main Street
Cambridge, MA 02142
USA

- List View
- Detail View
- View Calendar

SYSTEM FOR PERSONAL MAIL PIECE TRACKING AND TRACING FROM MULTIPLE SOURCES BY USER IDENTIFIER

CROSS-REFERENCE TO RELATED APPLICATIONS

The present application is a continuation of commonly assigned U.S. application Ser. No. 14/314,849, filed on Jun. 25, 2014 by Joshua R. Smith et al. for PERSONAL MAIL PIECE TRACKING SYSTEM, now issued as U.S. Pat. No. 10,304,026 on May 28, 2019, which is a continuation of commonly assigned U.S. application Ser. No. 13/948,719, filed on Jul. 23, 2013 by Joshua R. Smith et al. for PERSONAL MAIL PIECE TRACKING SYSTEM, now issued as U.S. Pat. No. 8,874,451 on Oct. 28, 2014, which is a continuation of o commonly assigned U.S. application Ser. No. 09/966,033, filed on Sep. 28, 2001 by Joshua R. Smith et al., now issued as U.S. Pat. No. 8,527,284, on Sep. 3, 2013, for a SYSTEM FOR PERSONAL MAIL PIECE TRACKING AND TRACING FROM MULTIPLE SOURCES BY USER IDENTIFIER, which claims priority from U.S. Provisional Patent Application Ser. No. 60/236,976, filed on Sep. 29, 2000, by is Joshua R. Smith, et al. for ASSOCIATING ELECTRONIC DATA WITH PHYSICAL OBJECTS.

BACKGROUND OF THE INVENTION

Field of the Invention

The invention relates to methods and apparatus for linking data, and objects of varying kinds, whether electronic or physical or both.

Background Information

Various delivery companies offer services through which packages can be tracked and/or traced. In order to track a package, the intended recipient must first know that the package has been sent, and second have available the package identifier that is assigned to the package by the delivery company. The identifier may be assigned to the package when the package is presented to the company by the sender, or the identifier may be assigned through the use of a precoded delivery label that the sender fills out and attaches to the package. Using the package identifier, the intended recipient can check with the delivery service either by telephone or on-line, to determine where the package is currently located, when the package is scheduled for delivery, and so forth. If the package does not arrive on a scheduled date, the intended recipient must then go back on-line or again call the delivery company and, using the assigned identifier, check where the package is, if a new delivery date has been set, and so forth.

If the intended recipient is to receive packages from several companies, he or she must contact the respective senders to obtain the various identifiers, and then contact each delivery company to obtain the relevant delivery information. The recipient must thus keep track of the various package identifiers, the dates which companies are delivering the respective packages, and so forth. Further, as delivery dates change, the intended recipient must again contact the various companies, supply the appropriate identifiers, and ask the respective delivery company representatives or query the companies on-line to ascertain the new dates.

Catalog companies may send intended recipients e-mail messages to inform them of expected shipping and/or delivery dates for previously ordered articles. Each time a date changes for a particular order, however, the company must again send the intended recipient an e-mail message to inform him or her of the new date. The company may also inform the intended recipient of the current locations of the packages via e-mail messages, as a way of keeping the intended recipient informed of the expected delivery dates. The intended recipient must thus sort through the e-mail messages relating to various purchases and associate a given e-mail with a particular purchase in order to maintain an updated shipping and/or delivery schedule.

The sender must go through similar steps to trace the packages he or she has sent. If, for example, a particular package is not delivered by a scheduled deadline, the sender first has to learn of the problem and he or she then has to contact the delivery company with a package identifier and ask or query about the current location of the package and new expected delivery dates. Further, the sender has to again follow-up with the intended recipients and/or the delivery companies associated with the respective packages, to determine if the packages are delivered on the new dates, and so forth.

SUMMARY OF THE INVENTION

The invention is a personal tracking and tracing system that provides a user with information relating to the delivery status of packages, catalogs or other mail pieces sent to or by the user through various catalog companies, delivery services, and/or the postal service. The system provides a user with information about the mail pieces through a personal web page, and thus, the user does not need to know identifying numbers for the respective mail pieces. Further, the user does not even need to know that a particular package has been sent before he or she learns through the personal tracking and tracing system to expect a delivery. The system updates the delivery status information, i.e., expected delivery dates, current locations and so forth, based on information supplied by the delivery companies and/or the postal service. Thus, to keep track of the changes to the delivery status, the user has only to check his or her web page rather than inquire at the various companies or the postal service and/or sort through e-mail messages from them.

The system provides the user with a table that includes an entry for each mailpiece. The table may link related information, such as catalog sale information, magazine subscription offers, bill payment options and so forth to the table entry for a given mail piece. Further, the system may link to the entry more detailed information about the particular mail piece, such as a description or digital image of the contents. The user may then "click" on the links to, for example, view and pay a bill electronically. Also, the system may link to the table entries various attachments, such as related messages from the sender, the delivery company and/or the postal service. A company or an individual sending or delivering the mail piece may thus inform the intended recipient that, for example, a signature or payment is required at time of delivery. Alternatively, or in addition, the attachment may provide a mechanism by which the user can respond to, for example, offers that are contained in the mail piece.

The personal tracking and tracing system allows the user to track and trace packages without having to contact the sender, intended recipient, and/or the delivery company or postal service. Further, the system may link other information to the mail piece delivery status, such as purchase or payment history, related credit card debit or credit information and so forth, to provide the user with confirmation of the completion of a transaction that involves a particular mail piece.

BRIEF DESCRIPTION OF THE DRAWINGS

The invention description below refers to the accompanying drawings, of which:

FIGS. 1-8 are screen snapshots of a graphical user interface that is useful in accordance with the personal tracking and tracing system;

DETAILED DESCRIPTION OF AN ILLUSTRATIVE EMBODIMENT

The present invention is particularly directed to methods and apparatus for facilitating the personalized tracking and/or tracing of mail pieces, by which is meant to include letters, catalogs, newspapers, magazines, packages and physical objects of all kinds. It is expected to be of especial use as part of a postal system such as the United States or other Postal Offices, although it is not so limited and has numerous other applications as will be apparent on reading the following detailed description.

As will be seen from the detailed description of a specific embodiment herein, the system provides to a user such as to an intended recipient, whether an individual, a business or organization, etc., a personalized web page that contains delivery status information about mail pieces directed to or sent by the user. The web page also associates with the delivery status information for a given mail piece various related information, such as, the delivery mechanism, i.e., land or air or postal service; mail piece type; and, as appropriate, links to related on-line subscription or catalog offers, payment options and so forth. The table further includes an attachment field in which messages from the sender, postal service or other delivery company may be linked to the mail piece delivery status information.

The delivery status information may be displayed in a table, with entries that are distilled from information provided by the sender, the postal system or other delivery services, and/or the intended recipient. Using the table, the user can readily track and trace the respective mail pieces from the date the mail pieces are provided to, for example, the postal service until the date the mail pieces are delivered by the postal service to the intended recipients.

Figure 1:
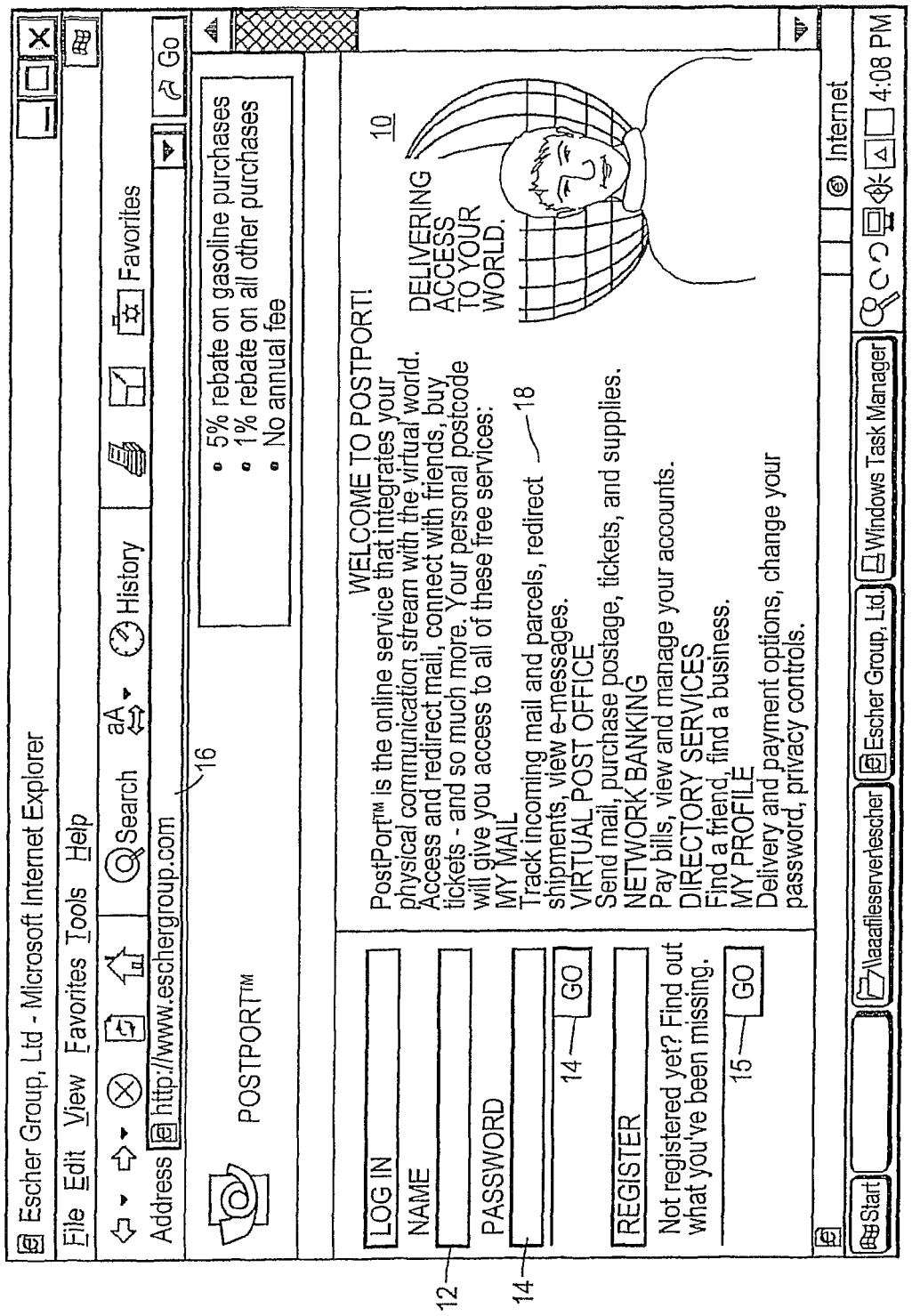

The invention is explained by means of various screens. FIG. 1 depicts an introductory screen 10 of an exemplary graphical user interface that may be used in accordance with the present invention. The screen is displayed, e.g., on the video monitor of a computer connected to a computer network such as, but not limited to, the worldwide web. The screen summarizes the services that a user may access from the screen. In the present instance, five categories of services are provided, namely: My Mail, Virtual Post Office, Network Banking, Directory Services and My Profile. The personal tracking and tracing system described herein is provided under the My Mail category. While the other service categories may have various links to and from the information provided under the My Mail category, we do not otherwise discuss the other services. Certain of the service categories are discussed in a co-pending United States Patent Application entitled METHOD AND APPARATUS FOR LINKING DATA AND OBJECTS and accorded Ser. No. 09/865,889 which is assigned to a common assignee and incorporated herein in its entirety by reference.

The screen 10 contains an area 12 for entry of a user name and an area 14 for entry of a password. The name, which may be any sort of user ID, and the user password control access to the My Mail and the other services. The user ID may comprise, for example, the user's given name, an identifier assigned by the system or the user's e-mail address. The password is preferably chosen by the user him or herself, since that access to the personalized services is controlled by the user. An address area 16 displays the address of the site on the web to which the user is connected, that is, the site that is providing the desired services. The site is, for example, initially accessed in the usual manner, i.e., by entering the web address in a browser and pressing "return" on a keyboard, or by clicking on a link to the web address that is presented, e.g., on a website of the postal service or on some sort of other video display. "Button" 15 enables the user to register at the website for the My Mail or other services provided through what is referred to herein as the "Postport System." Button 13 in conjunction with a selection of a service from a list 18 allows the user to access the selected service.

Figure 2:
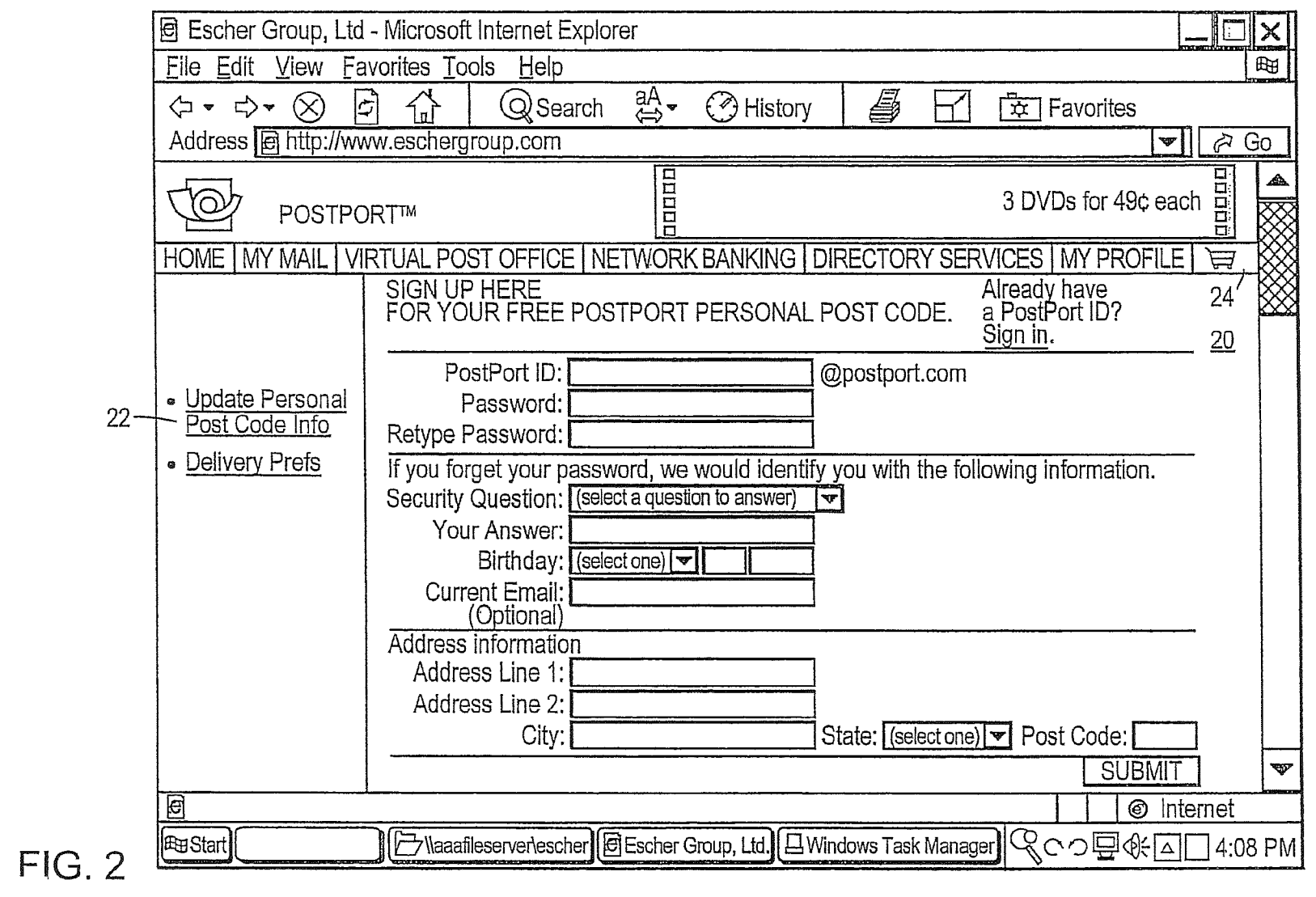

FIG. 2 depicts screen 20 to which a user is directed when button 15 of FIG. 1 is used to sign into the Postport system for the first time. Using the screen 20, a new user provides the requested address and identification information in order to register for the various Postport system services, and thus be assigned a Postport User ID. A user previously registered may be provided access to the screen 20 by selecting the My Profile service from the list 18 on the screen 10 of FIG. 1. Using the screen 20, the registered user may change its address, identification and/or password information. After registering or updating the registration information, the user selects one of the other services, for example, the My Mail service, using the menu bar 24.

Figure 3:
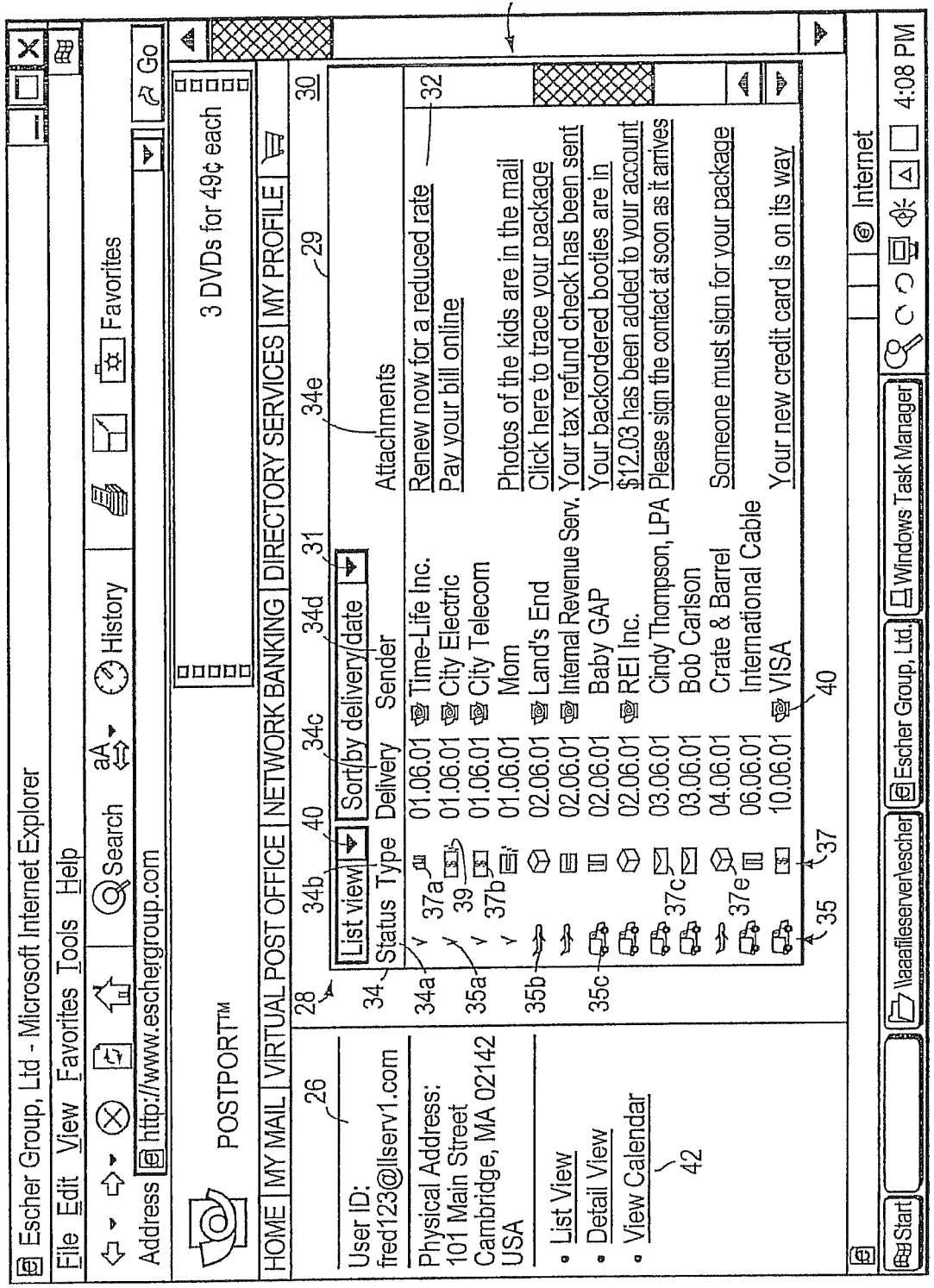

Referring now to FIG. 3 screen 30 depicts an exemplary display that a registered user obtains by selecting My Mail from, for example, the list of screen 10 (FIG. 1) or the menu bar 24 of screen 20 (FIG. 2). The display is essentially a personal web page for the user identified by the user ID 26. The display includes a table 28 with entries 32 for the respective mail pieces that are directed to the user, who in the example is an individual. The table entries are sorted by delivery date, as indicated by the menu bar 29 that is associated with the table. By selecting an appropriate sort category from a list (not shown) that is pulled down using an arrow 31, the entries may instead be sorted by sender, delivery address, if the user has more than one, or by mail type, for example, packages, letters, bills and so forth.

The user may instead view a table that contains information about mail pieces which were sent by the user. To do this the user selects the appropriate table category from a list that is pulled down using arrow 40. The table of outbound mail pieces and the information contained therein are discussed in more detail below with reference to FIG. 7.

Referring still to FIG. 3, the table entries 32 may be viewed in more or less detail by selecting the appropriate view category from a sidebar menu 42. The calendar view category depicts the table entries as mail piece type icons 37 on the appropriate days of a displayed calendar, as discussed in more detail in the co-pending application that is incorporated herein. The detailed view listing displays the respective table entries in more detail, is discussed below with reference to FIG. 6. The icons may further be linked to information that indicates the current locations of the respective packages. Alternatively, the table may include a separate location field (not shown).

The table 28 includes a plurality of fields 34 that contain, for each entry, information relating to the corresponding mail piece. A status field 34a informs the user of the delivery status of the mail piece through the icons 35. If the mail piece has been delivered, the entry includes a checkmark 35a in the status field. For a mail piece that has not yet been delivered, the entry includes in the status field an icon that indicates how the mail piece has been shipped, i.e., by postal air service as indicated by a plane icon 35b, or by postal ground service as indicated by a truck icon 35c. Additional icons may be used to indicate other delivery services and/or companies, such as, Fed Ex, UPS, and so forth, or the icons 35 may be linked to the associated delivery service and/or company information.

A type field 34b indicates to the user, again through the use of icons 37, the category of mail piece. The mail piece may be a magazine as indicated by the icon 37a, a bill as indicated by the icon 37b, a letter as indicated by the icon 37c, a package as indicated by the icon 37d or a catalog as indicated by the icon 37e, and so forth as indicated by various other icons 37. A delivery field 34c informs the user of the actual or expected delivery date, while a sender field 34d informs the user of the source of the mail piece. An attachment field 34e displays an associated message that was supplied by the sender of the mail piece and/or the postal service or other delivery company.

The type status field 34b includes a "lightning bolt" icon 39 in an entry 32 that includes an attachment that is available to the user only through the Postport system, and is thus not available at, for example, the sender's web site. In the table 28, the entry that corresponds to a letter (icon 37c) from Mom (sender field 34d) includes a lightning bolt icon to indicate that there is a message that is associated with the mail piece through the Postport system. To read the message, the user clicks on the displayed information. The information displayed in the attachment field in a given entry is essentially information that identifies the associated message to the user, much like a Re: line in an email message. Alternatively, the display in the attachment field may be the start of the message.

As another example, the lightning bolt icon 39 associated with the bill (icon 37b) from City Electric (sender field 34d) indicates that an attachment to the entry 32 includes a message that is associated with the City Electric bill and available to the user only through the Postport system. For this entry, the displayed information indicates that the attachment relates to the user's on-line account, and the user simply clicks on the displayed information to read the associated message. The message may, for example, set up the payment transaction through the user's account, and allow a user to make the payment simply by approving the transaction.

For those entries 32 without lightning bolt icons 39, the user may instead view the same information on, for example, the sender's web site. The attachment to a magazine (icon 37a) may, for example, be a message about subscription offers that is sent to everyone who receives a copy of a particular magazine. The user can read the attached message if he or she is interested in subscribing or otherwise ignore the message.

The table may also include in a given entry a link to a mechanism that allows the user to respond electronically to, for example, the subscription offer. The link may be included in the message that is available from the attachment field or may be included in information contained in or accessible from the sender field, as discussed below.

The sender field 34d includes Postport icons 40 in the respective entries 32 for which the source of the information has been authenticated. Certain sources, such as utilities, may supply certain or all of the mail piece content with a digital signature. The digital signature relates at least to the information that identifies the source of the mail piece. The Postport system uses the digital signature in a conventional manner to verify that the information was sent by the indicated source and, as appropriate, that the content has not been altered.

As an example of using the table 28, the user learns from the first entry 32 in the table of screen 30 that a magazine, as indicated by the icon 37a in the type field 34b, was delivered on the sixth of January 2001, as indicated by the check mark 35a in the status field 34a, and the date in the delivery field 34c. The entry has, as an attachment, a general message concerning subscription renewal that is otherwise available on-line.

Figure 4:
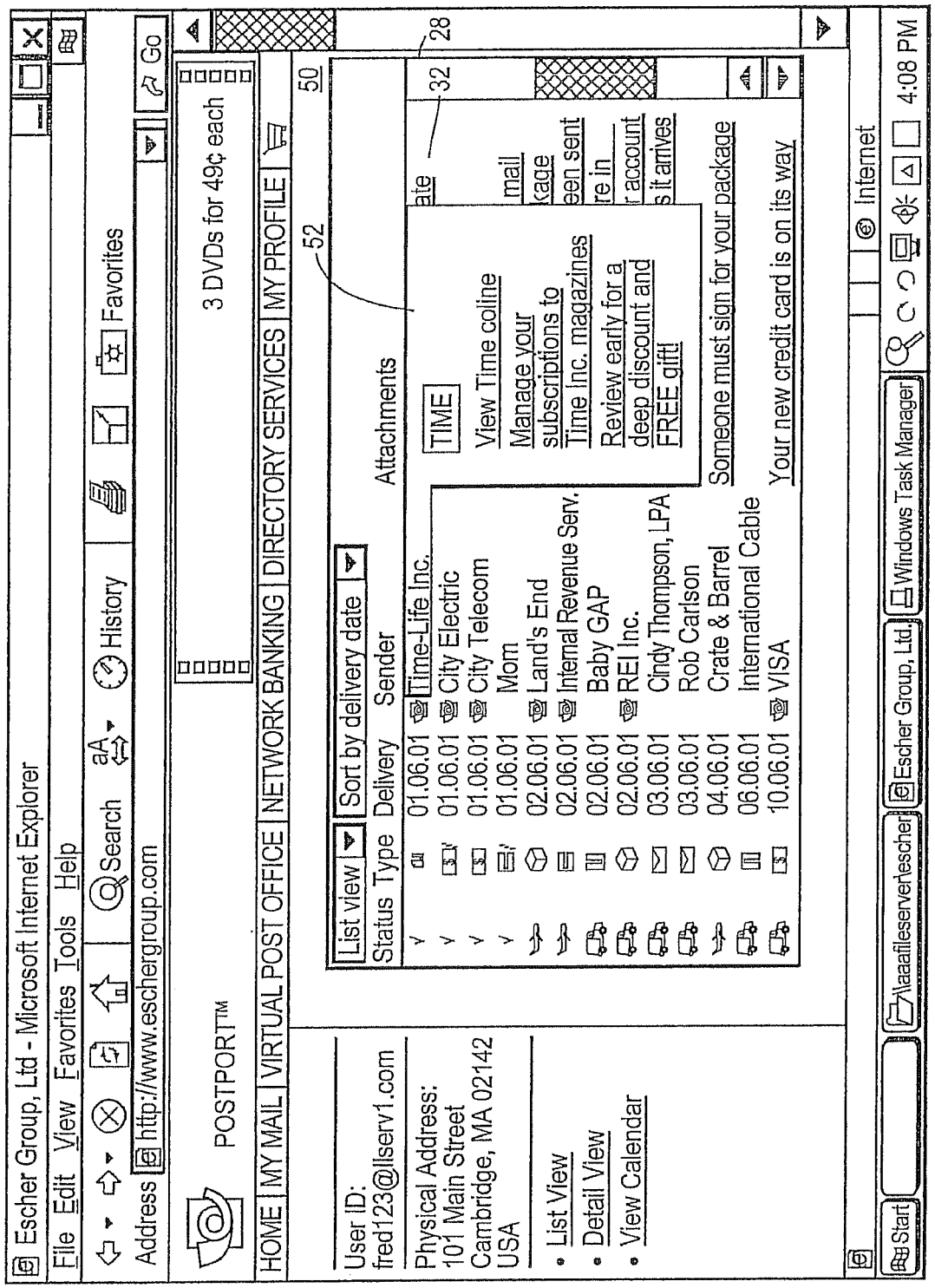

Through information contained in or accessible from the sender field 34d, an entry 32 may be further associated with one or more links to a sender company URL, to various associated mail-piece specific information, and/or to mechanisms through which the user can respond electronically to offers included in the mail piece, such as, for example, subscription offers. The user clicks on the information displayed in the sender field and is either directly connected by the links to, for example, a particular URL or, as discussed below with reference to FIG. 9, to other company information associated with the mail piece through the Postport system. Alternatively, as depicted in FIG. 4, the user may be presented with a screen 50 that includes a pull-down menu 52 of the various links.

Figure 5:
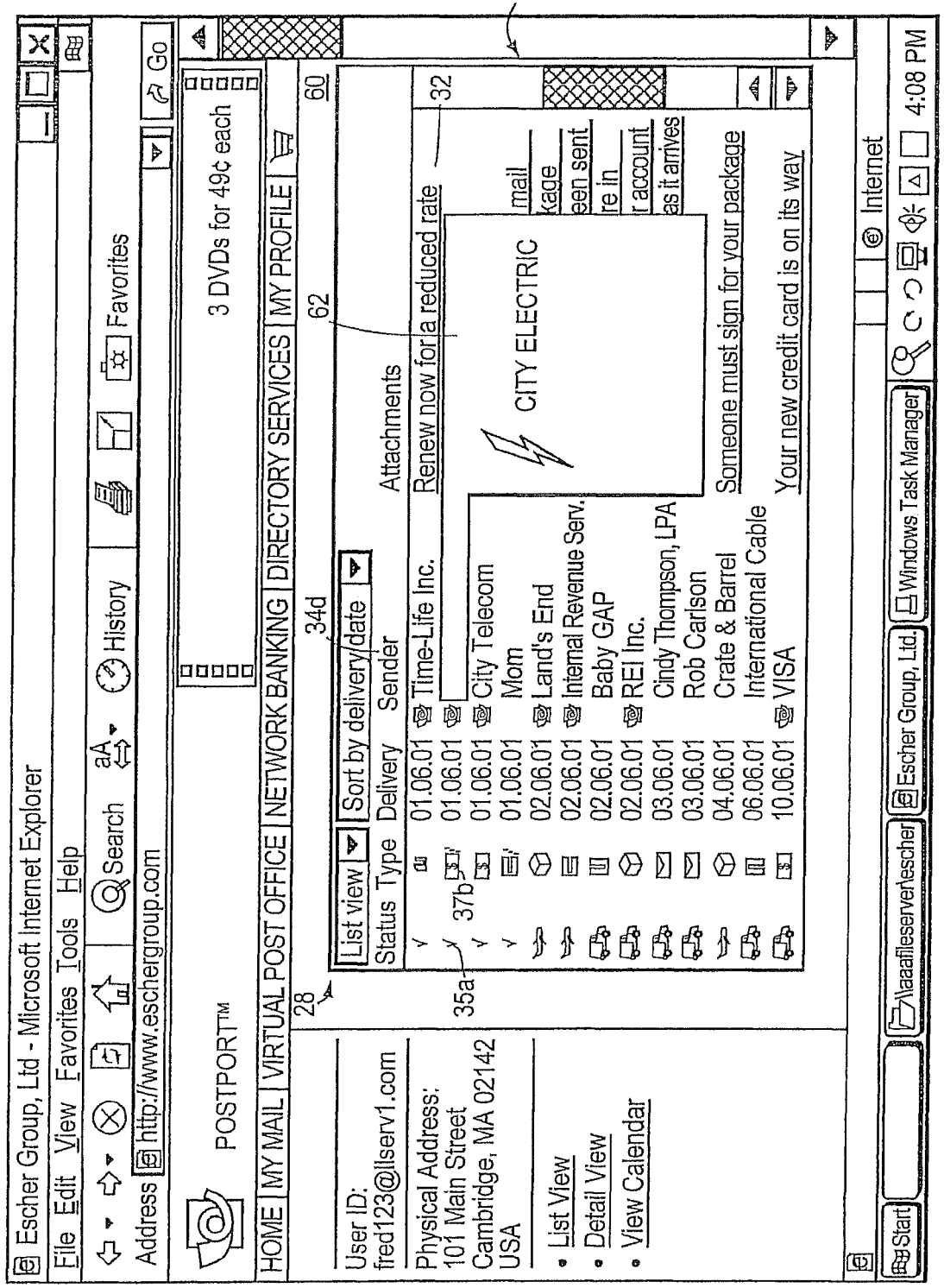

FIG. 5 depicts a screen 60 in which a pull-down menu 62 for an entry 32 in the table 28 that corresponds to bill (icon 37b) from City Electric (field 34d) provides to the user links to the web pages associated with various on-line bill payment services offered through City Electric. As discussed in more detail below with reference to FIG. 7, the Postport system can trace such a payment and provide to the user a payment delivery date.

Figure 6:
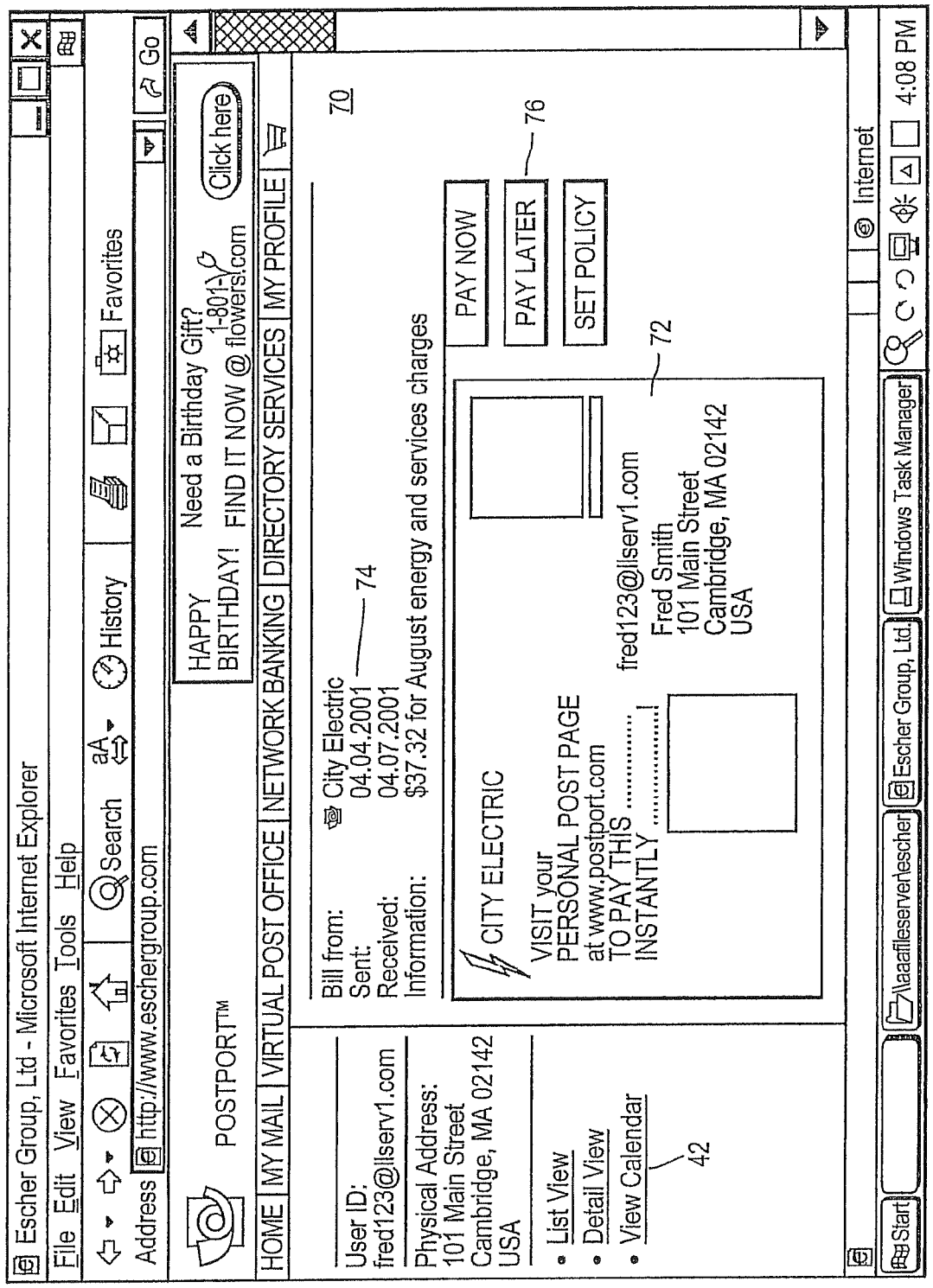

Referring now to FIG. 6, a user may obtain a detailed view of a particular mail piece, for example, the City Electric bill, by highlighting the corresponding table entry 32 and clicking on the detail view listing in the sidebar 42. The system then displays a screen 70, which may include a copy or facsimile 72 of the corresponding mail piece and a list 74 of mail piece particulars, namely, sender, date sent, date received, and relevant information, such as the amount of the bill. The user has options, delineated by buttons 76, of paying the bill now from his or her on-line account, paying later from the account at a specified or unspecified date, or setting a payment policy such as directing that a certain portion of the bill be paid now and the remaining portion of the bill be paid after, for example, the deposit of a paycheck into the user's account. Through the buttons, the Postport system thus cross-links the mail piece information with the on-line account and payment information provided by, in the example, City Electric.

The detailed views of various table entries 32 may include other images such as a copy of a bill, a catalog cover, and so forth. Further, the detailed view may include various mail delivery options that are accessible using the screen buttons. For example, the user may instruct the postal service to throw away future catalogs from a given sender, or re-direct the catalogs to a different address. As discussed in more detail in the co-pending application that is incorporated herein by reference, the Postport system links the selected delivery options with the user ID, and thereafter, follows the delivery instructions with respect to mail pieces directed to the user.

The mail piece image 72 included in the detailed view may be provided by the source of the mail piece, or alternatively, the image may be provided by the postal service or other delivery service by the scanning of the mail piece.

Referring now to FIG. 7, the Postport system also provides personal tracking and tracing of mail pieces sent by the user. As depicted in screen 100, a table 128 includes entries 132 for the respective mail pieces that the user has sent. The user selects this table from a pull down menu (not shown) using arrow the 40 in menu bar 29. The table includes status, type and delivery fields 134*a*, 134*b* and 134*c* that are similar to the fields of the table 28 discussed above with reference to FIG. 3. The information for these fields may be supplied by the postal service or other delivery company when the mail piece is provided to them by the user. In the case of electronic mailings, such as on-line payments, the information may instead be supplied by the company that is the intended recipient.

The table 128 includes a field 134*d* that specifies the intended recipient. This information may be supplied directly by the user, supplied through a machine readable code on a pre-coded delivery label or, for electronic mailings, supplied by the user or by the intended recipient. The table also includes a field 134*e* for memos provided by the user and/or the postal service. The user may, for example, type a message into the system when the user is providing the mailing address information for a mailing label, or when he or she is making an electronic payment of a bill.

Using the table 128, the user can track when, for example, an on-line payment was received by a particular company. In the example, the user may trace an on-line payment to City Electric made using the payment option available through the City Electric bill entry 32 in table 28.

Figure 8:
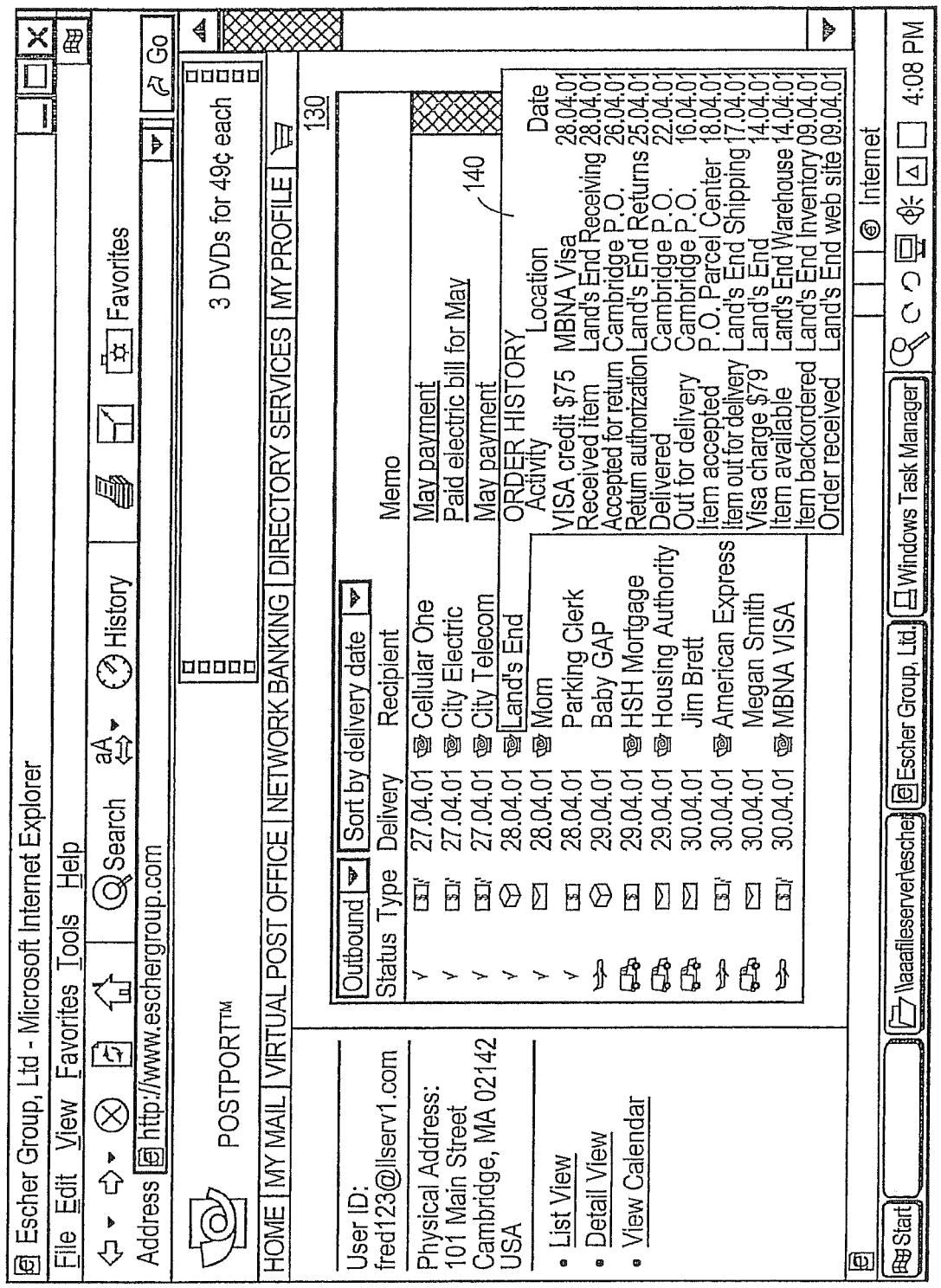

The respective table entries 132 may also be linked to other information that the company to which the mail piece is directed maintains by, for example, account, invoice or transaction numbers associated with the respective mail pieces. One such example is depicted in screen 130 of FIG. 8, in which the entry for a return to a particular company includes a display 140 of an associated transaction history. The Postport system links the mail piece with the transaction information based on an associated invoice or transaction code that is supplied by the user on the mailing label of the mail piece, or by the company on a precoded return label.

Using the Postport system, the user may thus have in one table a complete record of a transaction from start to finish, including the dates of the delivery of an ordered article to the user and the return delivery of the article to the company, the dates of the debiting and/or crediting of the transaction to his or her credit card, and so forth. Transaction information may similarly be available from, for example, utility companies that bill the user monthly. The user may thus have at any given time up-to-date billing and payment histories, without having to contact the respective billing companies.

The Postport system can be thought of as giving a mail piece a digital shadow, that is, a link from the physical mail piece to information about the mail piece or associated with the mail piece by the sender, the postal service and/or the intended recipient. The information linked to the mail piece can be address and delivery particulars, a digital copy of the mail piece, a summary of the mail piece, an excerpt from the mail piece, a history of the transactions associated with the mail piece, and so forth. Other information associated with the mail piece can be hyperlinks to source or recipient URLs, and personalized or general message attachments.

As discussed above, the Postport system utilizes a server to acquire and cross-link information from the various mail piece sources and the postal service or other delivery companies. The system then organizes the information into personal web pages for the respective users and, as appropriate, includes therein links to sender URLs on-line accounts and transaction information.

Figure 9:
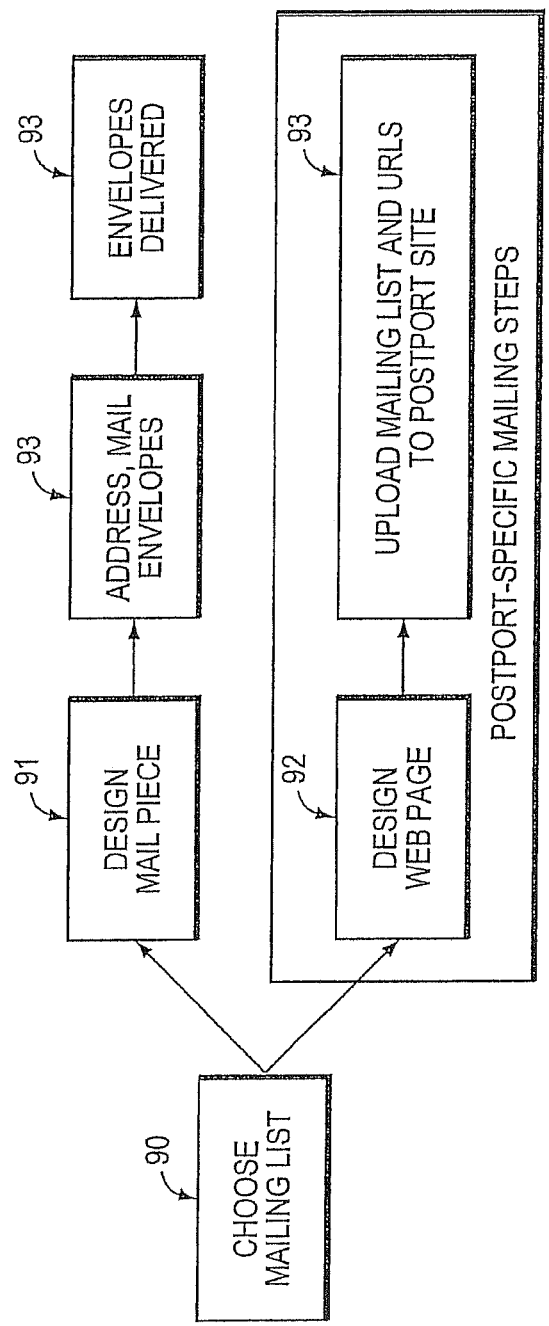
FIG. 9 is a flow chart of steps in providing mail piece information to the system.

As illustrated in FIG. 9, a company normally performs specific steps in designing and sending out mailings. Typically, a company chooses a mailing list (step 90), designs a mail piece (step 91), addresses and mails the mail piece to the entities on the list by delivering them to, for example, the postal service (steps 93, 95). As applicable, the company may check that the mail pieces are delivered by contacting the postal service or the intended recipients. To take advantage of the tracking capabilities of the Postport system, the company also designs a document, such as an XML document, or a web page that contains the contents of or selected information from the mail piece (step 92) and provides the document or web page URLs and the names on the mailing list in an uplink to the Postport system web site or server (step 94). The Postport system then uses the document and associated list to produce entries 32 for the tables 28 (FIG. 3) of the respective users on the list, that is, to cross-link the table fields with the appropriate information based on the users' IDs. As discussed, the table entries also include related Postport system derived information such as associated delivery dates, current mail piece locations, delivery options, and so forth, as well as cross-links to associated on-line accounts, transaction histories and related information provided by the sender. Further, the document or the URLs may contain a link to a mechanism by which the intended recipient can respond electronically to any offers, such as subscriptions offers, included in the mail piece. The Postport system then links the table entries to the users' web pages and on request the system displays the appropriate entries as a table on a given user's web page.

The methods described herein are readily implemented using, e.g., conventional file servers and personal computers, although more powerful computers can, of course, be gainfully employed. The user database is readily prepared using conventional database software such as that supplied by Oracle, Microsoft, and IBM, among others, or by software such as the Escher Group's WebRiposte™ for web-based applications. Communications between users of the system and the hardware components thereof may utilize any form of electronic communication, such as direct wire, wireless, modems, and the Internet, among others.

Figure 10:
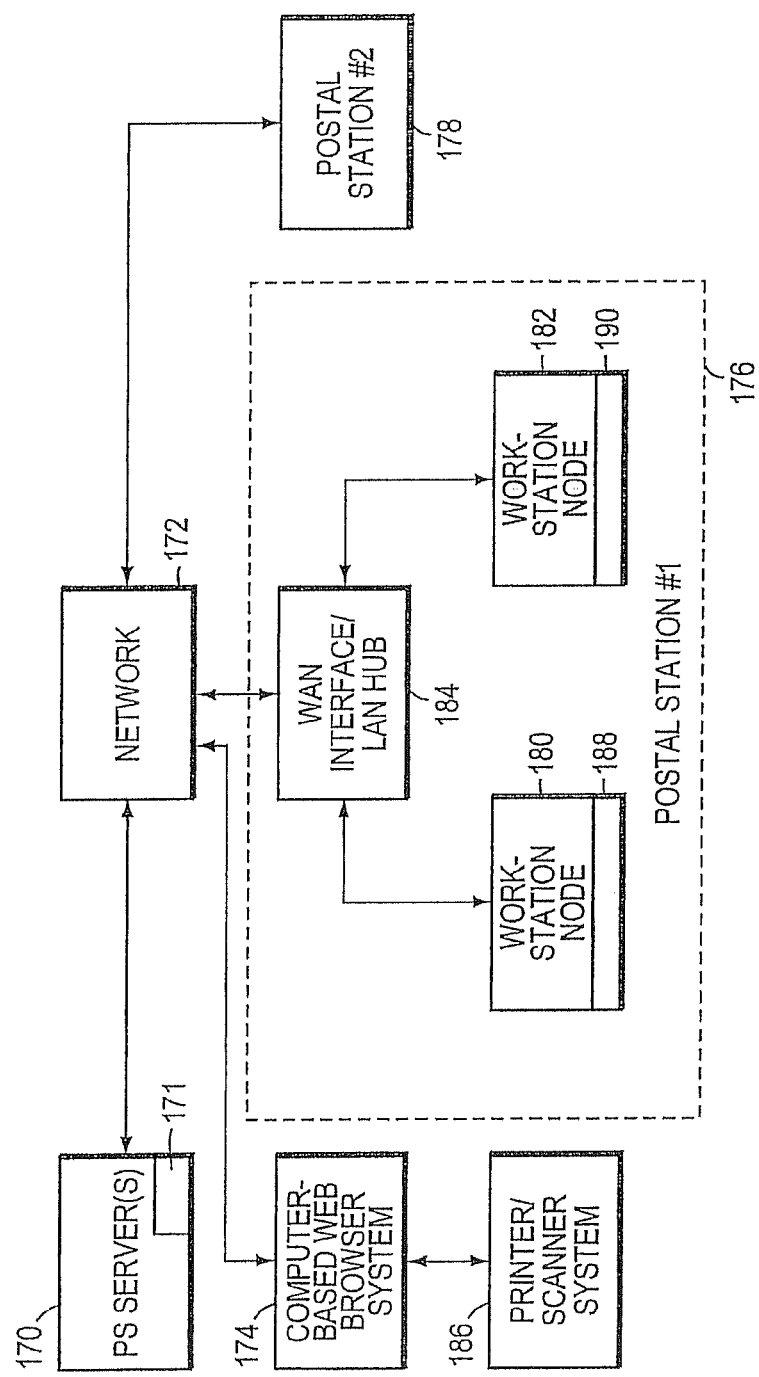
FIG. 10 is a functional block diagram of an environment in which the system may advantageously operate.

FIG. 10 illustrates an environment in which the system of FIGS. 1-8 is advantageously used. A Post Office server 170 is connected via a network such as the Internet 172 to one or more postal stations 176, 178 and a number of remote terminals or nodes 174 that run or have access to web browsers that communicate with the server or client executables that communicate directly with the server or with the web browsers. For simplicity, only one such node is shown but it will be understood that that number of nodes to be used is potentially unlimited. Each postal station contains one or more work station nodes 180, 182 which may be interconnected by a network 184. The nodes provide access to the browsers and/or clients that communicate with the server. If desired, printer/scanners 186-190 may be attached to the workstation nodes to enable scanned input and hard-copy output at the nodes. Node 174 may be located in the home or office of an individual; nodes 180, 182 are located at the various postal service stations maintained by the Post Office, and are made available to individual users.

The Postal Server may comprise a single server, or be one of a plurality of such servers, preferably interconnected for sharing data. Associated with each server is a database 171 on which the name and other pertinent data such as physical (i.e. street) address, email address, user ID, telephone number, and other such data with respect to each of its users are stored. The Postal Service itself may use the information in this database to associate the information about the mail pieces with the various users. Alternatively, the Postal Service may, under suitable conditions, provide access to its database directly to a third party, which may then associate various information with the identified users. For example, the third party may associate accounts or transactions with the respective users based on the identifying information contained in the database, and thereafter, supply relevant account or transaction information to the Postal Service sorted by the User IDs.

The user may employ the linkage system of the invention from his or her home (e.g., via web browsers or clients accessible through the node 174) or from a postal station 176, 178. Thus, wherever the individual has access to the browser or client, the user can personally track and trace mail pieces for which he or she is identified as the sender or the intended recipient.

As discussed, the Postport system links information about mail pieces to a user ID, such that the user can, through his or her personal web page, personally track and trace mail pieces directed to or sent by the user. The system may also link other information to the user ID, such as, for example, information associated with one or more postal transaction sessions. The user can then start, continue and end a given postal transaction session at any time by communicating with the system through his or her personal web page from virtually any PC or any postal station terminal, or node, that is capable of communicating with the postal servers 170. The Postport system may, for example, link information for use in printing mailing labels, buying and printing postage, and so forth, to the assigned user ID, such that the user can later access the information to continue, resume or end a given postal transaction session from, for example, a terminal of a postal station 176, 178.

Figure 12:
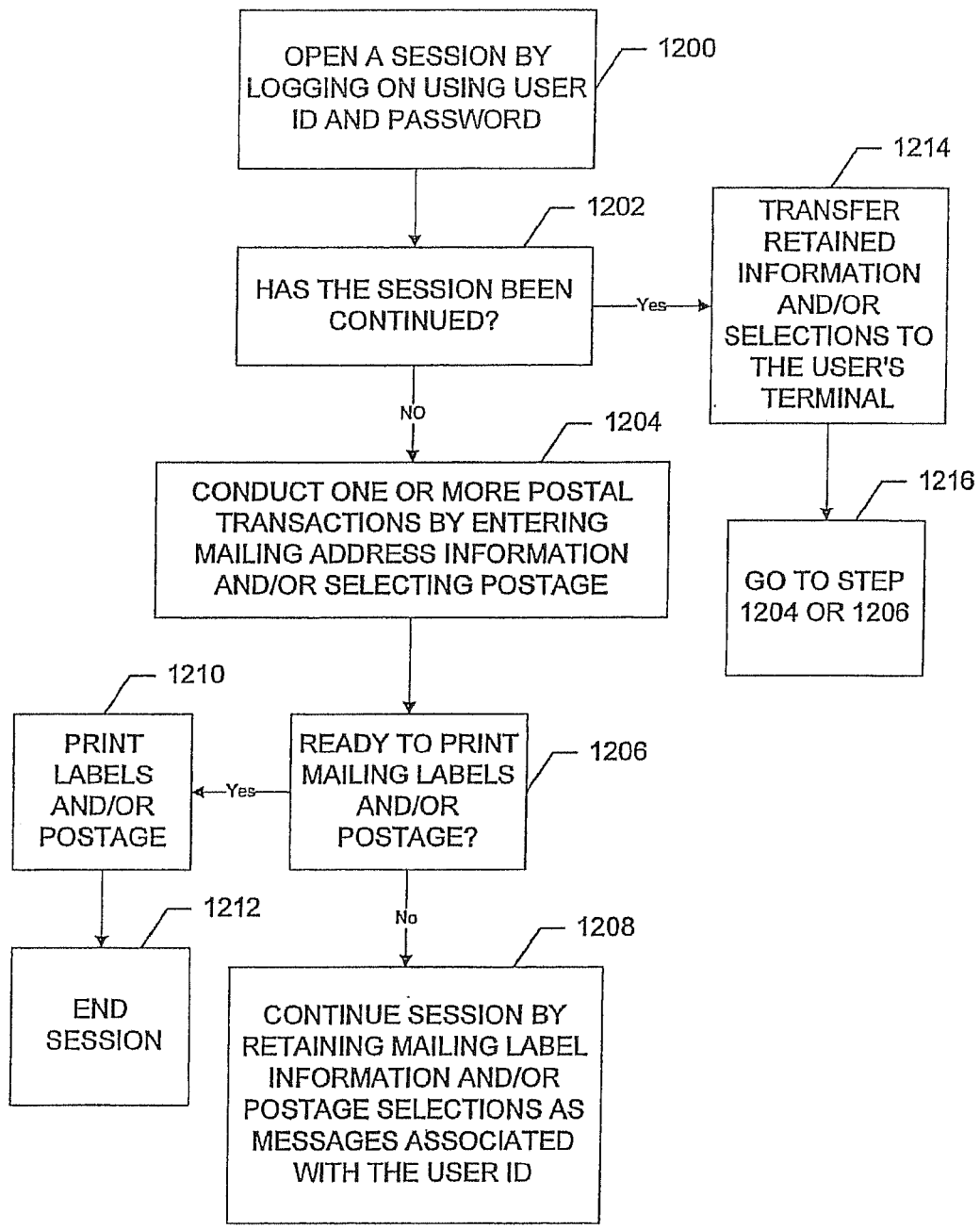
FIG. 12 is a flow chart of operations of the system of FIG. 10.

Referring still to FIG. 10 and also to FIG. 12, a user begins a postal transaction session from, for example, a remote node, or PC 174, by logging on to the Postport system using the assigned user ID and an associated password, as discussed above with reference to FIGS. 1 and 2 (step 1200). The user selects the Virtual Post Office services and conducts a postal transaction session in which the user enters mailing address information, selects postage, and so forth in the appropriate data templates or wizards provided by the Postport system (step 1202). The user may then print mailing labels and/or postage from his or her home PC using the printer 186 and end the session (steps 1206, 1210, 1212). Alternatively, the user may continue the session (steps 1206, 1208) and later print the labels and/or postage at the postal station 176 or 178 through the various workstation nodes 180, 182 when he or she is dropping off the mail pieces for delivery through the postal service (steps 1214, 1216).

If the user continues the session, the Postport system retains the relevant postal transaction session information in a manner that is linked to the user's assigned user ID, as discussed below (step 1208). When the user later logs on to the Postport system from, for example, a terminal 188 at the postal station 176 using the assigned user ID, the system transfers the session to the terminal (step 1214). The user then continues to enter and/or edit the mailing address and postage information and/or print the labels and the postage before ending the session (step 1216).

Figure 11:
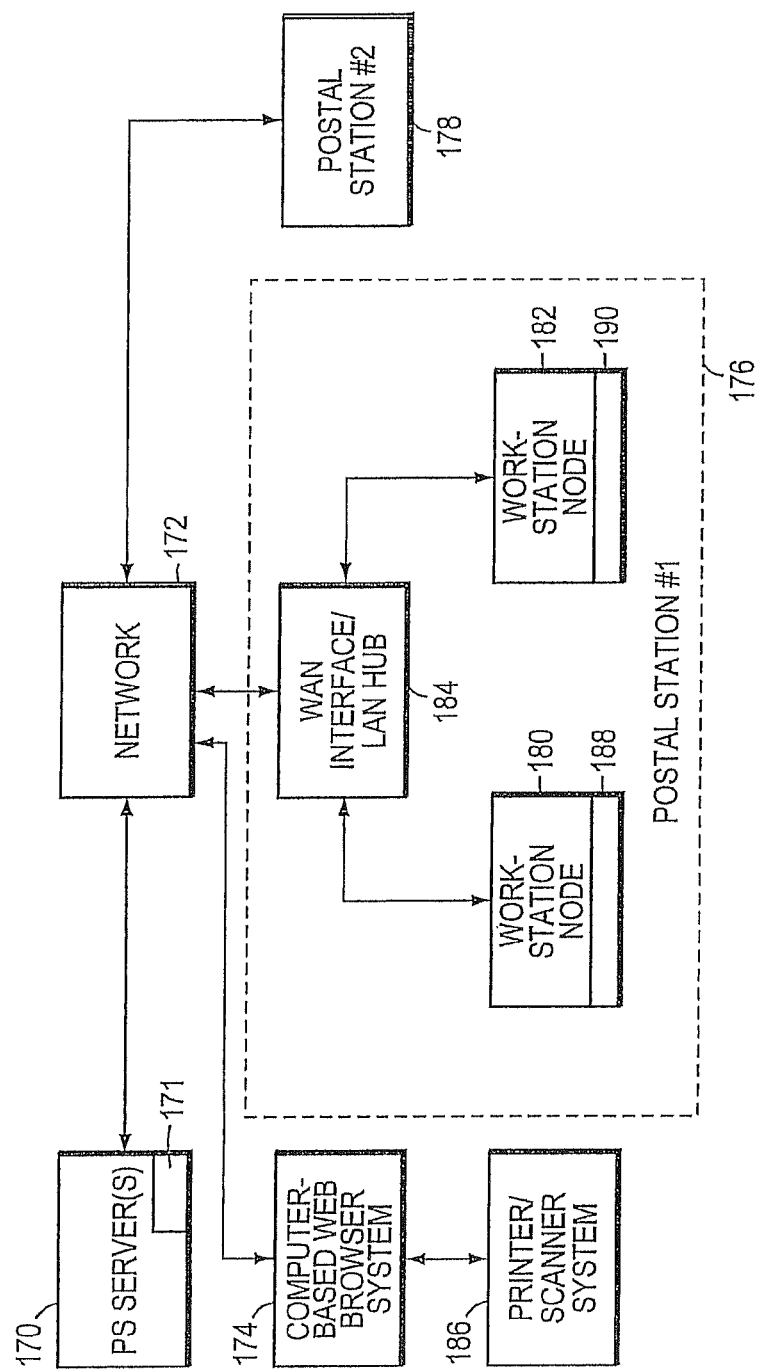
FIG. 11 illustrates a mechanism for presenting to the system of FIG. 10 a machine-readable user ID.

The session transfer may be facilitated by assigning to a given user a coded physical identification token, such as a key fob 200 with a User ID included as a machine-readable barcode 201 (FIG. 11). The user presents his or her physical identification token to a scanner that is connected to the system through, for example, the work station node 180. The system then prompts the user to supply his or her password and, after verification of the password, the system transfers the linked messages and thus the session to the terminal then in use. As discussed in more detail below, the system may also transfer the linked messages to the various other terminals in the same postal station, such that the user can readily transfer the session to another terminal that is connected to a printer, a postage meter, and so forth, by logging on using the assigned user ID. The user may thus take full advantage of the Postport system's virtual post office services, even if he or she does not have the appropriate hardware and/or software to print the labels and postage.

The physical identification token discussed above can also be used to provide the user with access to other information that is linked by the system to the assigned user ID. For example, the user may use the token to gain access to the personal tracking and tracing tables 28 and/or 128 via a terminal 180, 182 at one of the postal stations 176, 178.

More specifically, the Postport system server 170 stores information provided by a user during a postal transaction session as a plurality of queued or stacked messages. If Escher Group's WebRiposte data base software is used, the messages are retained in a WebRiposte message store. The messages include an attribute or field associated with the assigned user ID, and one associated with a customer session identifier that corresponds to the particular session. The system also assigns to each message a unique message identifier that includes the postal office (if any) in which the message was generated; the terminal, or node, from which the message was generated; and a sequence number that corresponds to the order in which the messages were generated by the node. The system also maintains an index, sorted by user identifier attribute, that allows the messages associated with a particular customer to be accessed quickly. Each time a user logs into the Postport system and selects the postal transaction session services or is identified to a postal workstation, the server checks the status of the associated message queue or store, at the server 170. If the terminal determines that the user has continued a customer session, the terminal essentially reconstructs the session using the associated queued messages and presents to the user the screens, templates and/or wizards that allow the session to be continued from the point at which the user last communicated with server.

If the user is communicating with the server 170 from a terminal in one of the postal stations 176 or 178, the system may broadcast the associated messages to all of the terminals in the station. Each terminal then maintains an up-todate message queue or store for the session that is associated with the assigned user ID. The user or a postal clerk may then readily transfer the session to any terminal in the postal station, to continue and/or complete the session, print out mailing labels, meter postage, and so forth.

Figure 13:
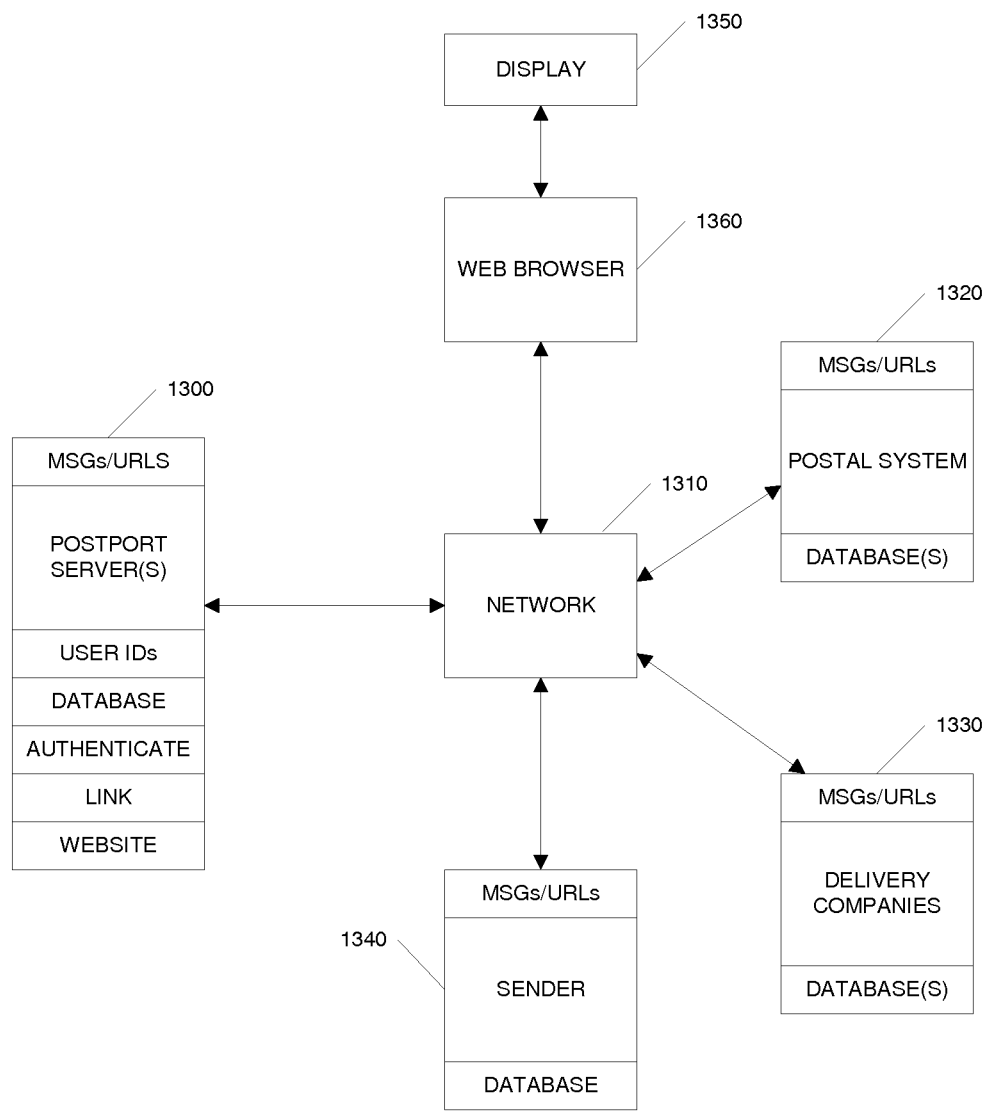
FIG. 13 is a functional block diagram of the system.

As discussed previously, and illustrated in functional block diagram form in FIG. 13, one or more servers 1300 of the Postport system acquire delivery information, about a given mail piece of a plurality of mail pieces, electronically by receiving messages from and/or by access to respective databases of at least two of a sender of the mail piece 1330, a postal service 1320 and a delivery company 1330. The one or more servers 1300 associate the delivery information about the given mail piece, and the actual given mail piece, with a user identifier that corresponds, in the system, to the intended recipient. The servers link information corresponding to the given mail piece, such as (1) delivery status information, (2) address and delivery particulars, and at least one of (3) a digital copy of the mail piece, and (4) an excerpt from the mail piece with the user identifier of the intended recipient. The servers send the links to, or provide access to the linked information via, a web component, such as, for example, a website. The user is thus provided with the capability to track and trace the given mail piece by logging onto the website.

Before providing the information to a user, a user-supplied user identifier and associated password are authenticated by the system, in a known manner, after the identifier and password are entered through a graphical user interface provided by a web browser 1360. Upon authentication, the web browser provides access to a display 1350 of the delivery status information linked to the user identifier. The display includes (1) the date of shipment of the given mail piece, (2) the date of delivery of the mail piece, and (3) one or more dates of debiting or crediting one or more payments associated with the mail piece.

The system encompasses variations of the components and operations discussed herein. For example, the system may assign more than one user ID to a given user, based on multiple postal addresses. The system then provides the user with the capability to individually track and trace mail pieces sent to or from the different addresses.

What is claimed is:

1. A mail piece tracking system including:
    one or more servers for linking mail piece delivery status information with user identifiers and producing listings of the mail piece delivery status information for mail pieces directed to respective users each of which is associated with a different user identifier of the user identifiers, wherein the mail piece delivery status information includes a sender identifier of a sender, a mail type identifier, and a delivery service identifier, and wherein the mail piece delivery status information includes one or more links to on-line information provided by or associated with the sender; and
    one or more browsers or client executables, executing on any of a plurality of different computing devices, through which the respective users access the mail piece delivery status information,
        wherein a transaction session for a given mail piece and initiated by the sender at a first computing device of the plurality of computing devices is continued at a second computing device of the plurality of computing devices by reconstructing the transaction session at the second computing device utilizing one or more message that include transaction session information that is provided at the first computing device that is linked to the sender identifier for the transaction session initiated by the sender at the first computing device.

2. The mail piece tracking of claim 1 wherein the one or more servers further configured to:
    associate a message from the sender with the mail piece delivery status information for the given mail piece; and
    include a link to the message in the mail piece delivery status information.

3. The mail piece tracking system of claim 1 wherein the one or more servers further configured to:
    associate the transaction session information with the delivery status information for the given mail piece, and
    include a link to the transaction session information in the delivery status information.

4. The mail piece tracking system of claim 1 wherein the one or more servers further configured to:
    associate information relating to contents of the mail piece with the mail piece delivery status information.

5. The mail piece tracking system of claim 1 wherein the one or more servers are further configured to
    include related messages from the sender and the delivery service in the mail piece delivery status information.

6. A method for tracking mail pieces comprising:
    associating respective users with user identifiers;
    associating mails pieces directed to or sent the by the respective users with respective user identifiers;
    linking mail piece delivery status information relating to the mail pieces to the respective user identifiers, wherein the mail piece delivery status information includes a sender identifier of a sender, a mail type identifier, and a delivery service identifier, and
        wherein the mail piece delivery status information includes one or more links to on-line information provided by or associated with the sender; and
    providing, to a given user, a listing of respective mail pieces and associated mail piece delivery status information that is linked to a given user identifier that corresponds to the given user,
        wherein a transaction session initiated at a first computing node utilizing the given user identifier is resumed at a second computing utilizing one or more messages that include transaction session information; provided at the first computing node that is linked to the given user identifier for the given user that initiated the transaction session at the first computing node.

7. The method of tracking mail pieces of claim 6 wherein linking mail piece delivery status information to the respective user identifiers comprises updating the mail piece delivery status information.

8. The method of tracking mail pieces of claim 6 wherein the linking the mail piece delivery status information to the respective user identifiers includes associating the mail piece delivery status information with sender information that identifies one or more different senders.

9. The method of tracking mail pieces of claim 8 wherein the linking the mail piece delivery status information to the respective user identifiers includes associating the mail piece delivery status information swith ender messages from the one or more different senders.

10. The method of tracking mail pieces of claim 6 wherein the linking the mail piece delivery status information to the respective user identifiers includes associating the mail piece delivery status information sender with service information that identifies respective mail piece delivery services.

11. The method of tracking mail pieces of claim 10 wherein the linking the mail piece delivery status information to the respective user identifiers includes associating the mail piece delivery status information with service messages from the respective mail piece delivery services.

12. The method of tracking mail pieces of claim 6 wherein the providing the listing includes providing a graphical interface to notify the given user, that corresponds to the user identifier, of a delivery status of particular mail pieces addressed to the given user.

13. The method of tracking mail pieces of claim 12 wherein the graphical interface is configured to display icons indicating different types of mail pieces addressed to the given user.

14. The method of tracking mail pieces of claim 12 wherein the graphical interface is configured to display delivery dates associated with the particular mail pieces.

15. The method of tracking mail pieces of claim 14 wherein the graphical interface is configured to display a date that a given mail piece was logged into a postal delivery service.

16. The method of tracking mail pieces of claim 14 wherein the graphical interface is configured to display a date on which delivery of a given mail piece is expected to occur.

17. The method of tracking mail pieces of claim 14 wherein the graphical interface is configured to display a date on which delivery of a given mail piece was made.

18. The method of tracking mail pieces of claim 12 wherein the graphical interface is configured to display source information concerning a source of a given mail piece.

19. A mail piece tracking system including:

one or more servers for linking mail piece delivery status information with user identifiers and producing listings of the mail piece delivery status information for mail pieces directed to respective users each of which is associated with a different user identifier of the user identifiers; and one or more browsers or client executables, executing on any of a plurality of different computing devices, through which the respective users access the delivery status information, wherein a transaction session for a given mail piece and initiated by the sender at a first computing device of the plurality of computing devices is continued at a second computing device of the plurality of computing devices by reconstructing the transaction session at the second computing device utilizing one or more message that include transaction session information that is provided at the first computing device and that is linked to the sender identifier of the sender that initiated the transaction session at the first computing device.

* * * * *